June 23, 1964  L. BRANNEMAN  3,138,381
EDUCATIONAL TOY SATELLITE SYSTEM
Filed Dec. 21, 1962  4 Sheets-Sheet 1

INVENTOR.
LEONARD BRANNEMAN
BY
McMorrow, Berman & Davidson
ATTORNEYS

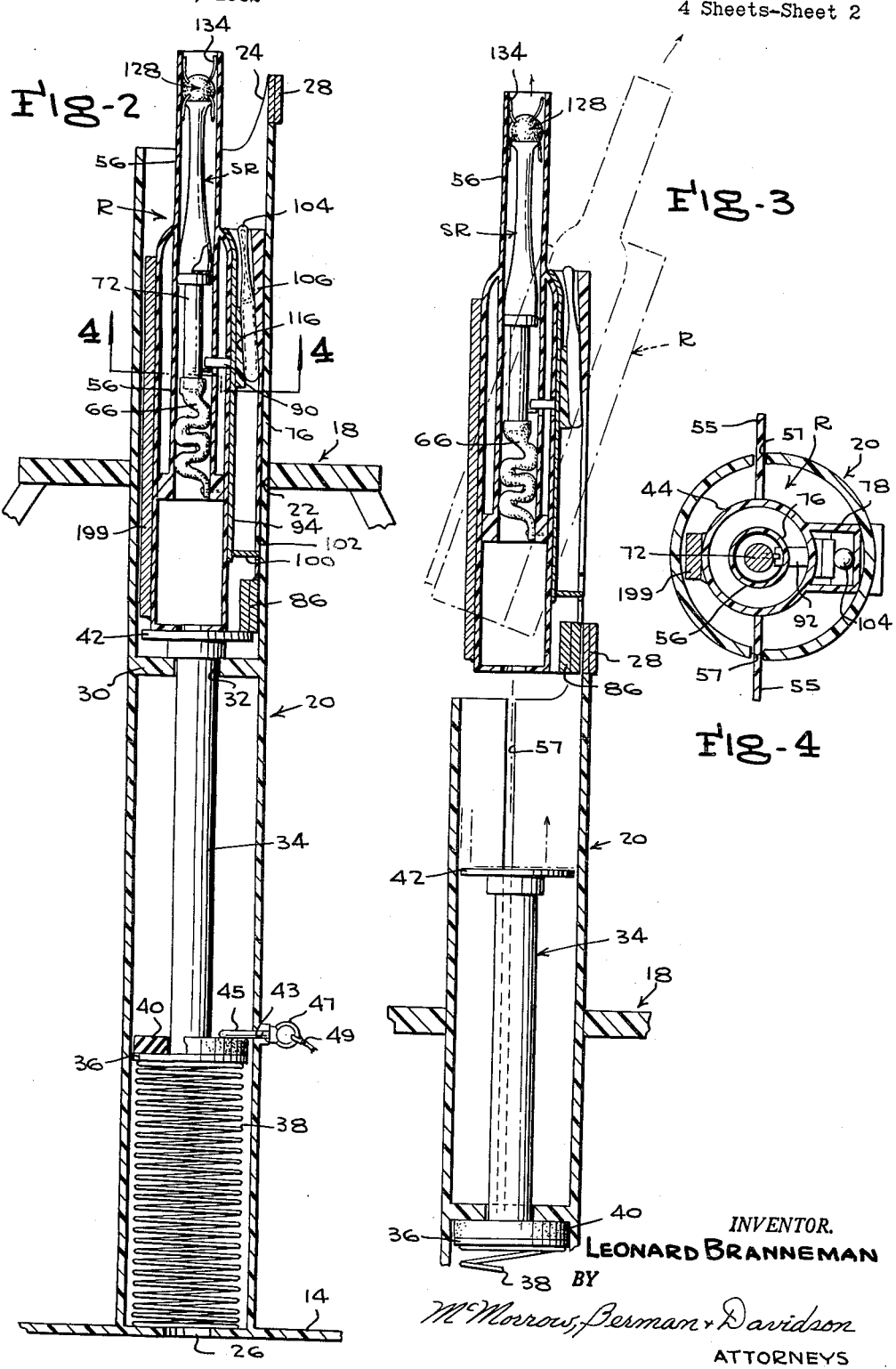
June 23, 1964 L. BRANNEMAN 3,138,381
EDUCATIONAL TOY SATELLITE SYSTEM
Filed Dec. 21, 1962 4 Sheets-Sheet 2
INVENTOR.
LEONARD BRANNEMAN
BY
McMorrow, Berman & Davidson
ATTORNEYS June 23, 1964 L. BRANNEMAN 3,138,381
EDUCATIONAL TOY SATELLITE SYSTEM
Filed Dec. 21, 1962 4 Sheets-Sheet 3
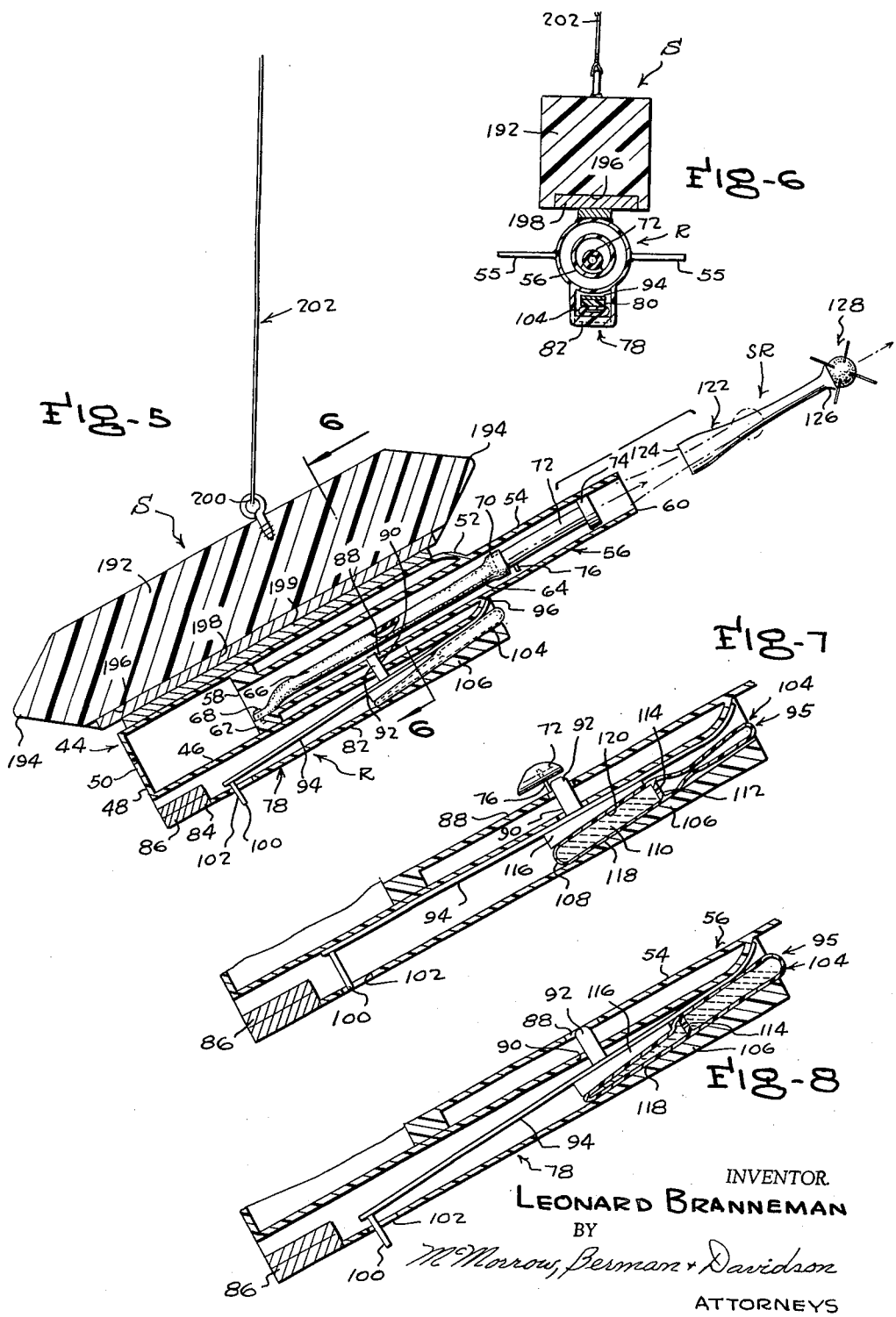
INVENTOR.
LEONARD BRANNEMAN
BY
McMorrow, Berman & Davidson
ATTORNEYS

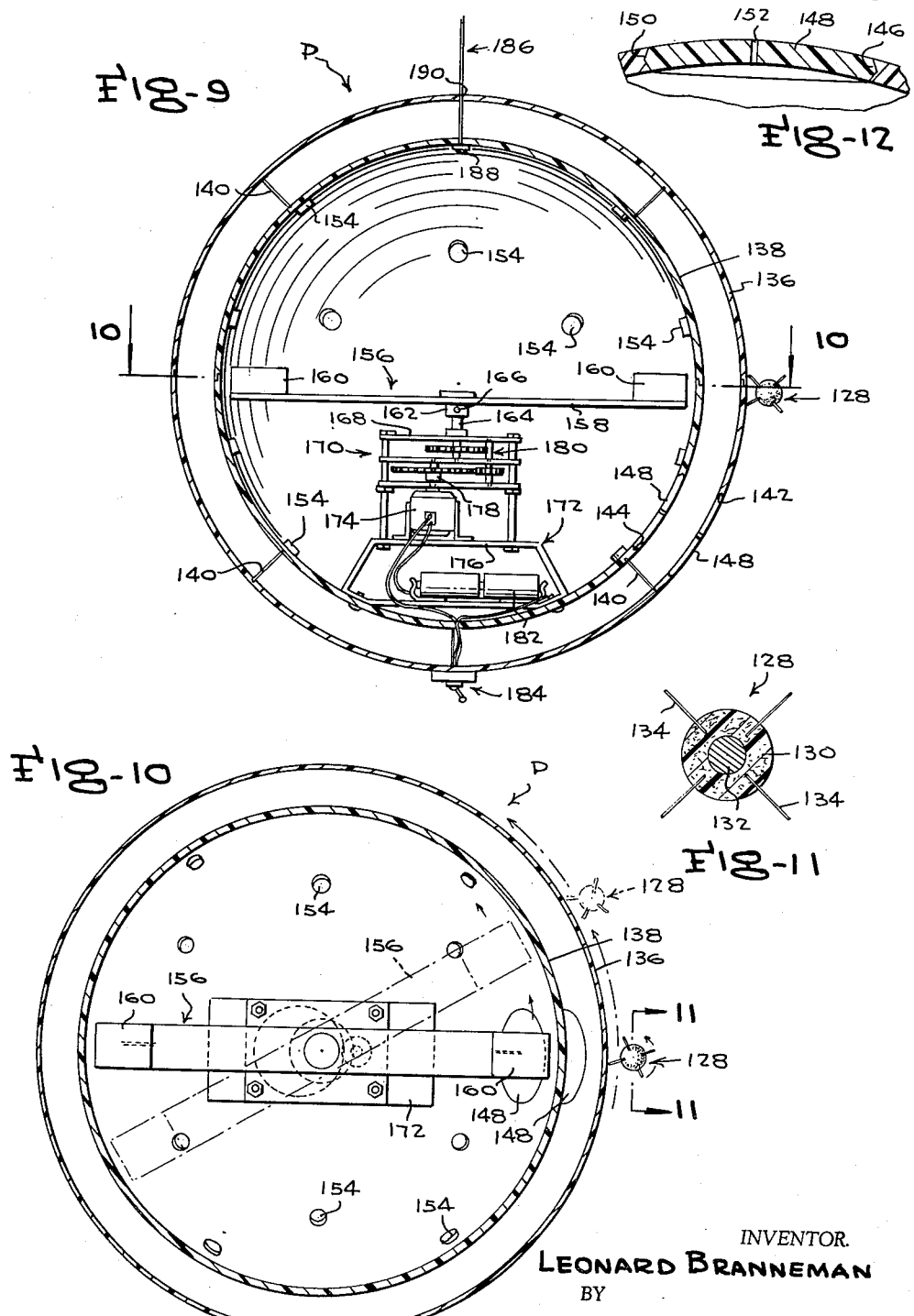

3,138,381
EDUCATIONAL TOY SATELLITE SYSTEM
Leonard Branneman, 9 Sheffield Road, Winchester, Mass.
Filed Dec. 21, 1962, Ser. No. 246,407
12 Claims. (Cl. 273—95)

This invention relates to a novel educational toy satellite system.

The primary object of the invention is the provision of a highly realistic and amusing system of the kind indicated, which comprises a launching pad including a simulated launcher, a multi-stage rocket assembly, a simulated space station with which the rocket assembly makes rendezvous, the rocket assembly comprising a booster rocket which remains at the space station and a satellite assembly which is propelled by the booster rocket to orbit a simulated planet.

Another object of the invention is the provision of a system of the character indicated above, wherein the space station and the booster rocket have magnets which produce arrestation of the rocket assembly at the space station and adherence of the booster rocket to the space station, preliminary to propulsion of the satellite to the planet, the booster rocket having time-delay propulsion means which assures delay of the propulsion of the satellite until after the rocket assembly has become attached to the space station.

A further object of the invention is the provision, in a system of the character indicated above, of a satellite assembly which comprises a second stage of the booster rocket and a magnetized spherical satellite, and wherein the planet has magnetic means for attracting and holding the satellite in contact therewith, the second stage being adapted to fall by gravity away from the satellite before the satellite reaches the planet.

A still further object of the invention is the provision, in a system of the character indicated above, of a planet which is a hollow sphere which contains motor means which rotates a magnetic rotor, which attracts and holds the satellite and moves the satellite in an orbit around the planet.

Other important objects and advantageous features of the invention will be apparent from the following description and the accompanying drawings, wherein, for purposes of illustration only, a specific form of the invention is set forth in detail.

In the drawings:

FIGURE 1 is a schematic perspective view of a satellite system of the present invention, showing a multi-stage rocket assembly in transit between the launcher and a space station, another multi-stage rocket assembly in rendezvous with the space station, the second stage of said other rocket assembly being in transit to the satellite, the second stage of a preceding rocket assembly being shown falling away from its satellite, and the satellite of another rocket assembly adhered to and orbiting the planet;

FIGURE 2 is an enlarged vertical longitudinal section taken on the line 2—2 of FIGURE 1, showing a multi-stage rocket assembly in place in the launcher with its trigger spring retained in inoperative position, and showing the launching spring held in compressed position;

FIGURE 3 is a fragmentary view, like FIGURE 2, showing the multi-stage rocket assembly on its way out of the launcher, with its trigger spring released and with its tilting magnet repelled by the tilting magnet of the launcher, for producing tilting of the rocket assembly, as shown in phantom lines, into a trajectory to rendezvous with the space station;

FIGURE 4 is a horizontal section taken on the line 4—4 of FIGURE 2;

FIGURE 5 is an enlarged vertical longitudinal section taken on the line 5—5 of FIGURE 1, showing its booster rocket propulsion means in operated position and its second stage propelled toward the planet;

FIGURE 6 is a vertical transverse section taken on the line 6—6 of FIGURE 5;

FIGURE 7 is a fragmentary and somewhat enlarged view like FIGURE 5, but showing the trigger spring in unoperated condition and in holding relation to the propulsion means, and the time-delay fluid-filled capsule in uncompressed condition;

FIGURE 8 is a view like FIGURE 7, showing the trigger spring in operated position and disengaged from the propulsion means, and the capsule in a compressed condition;

FIGURE 9 is an enlarged vertical section taken on the line 9—9 of FIGURE 1, and showing a satellite adhered to and orbiting the planet;

FIGURE 10 is a horizontal section taken on the line 10—10 of FIGURE 9, and showing satellites being moved around the planet in two different positions of the magnetic rotor, of the planet, shown in full and in phantom lines, respectively;

FIGURE 11 is an enlarged diametrical section taken on the line 11—11 of FIGURE 10; and FIGURE 12 is an enlarged fragmentary section taken through the outer shell of the planet and showing an access opening thereof and its removable cover.

Figure 1:
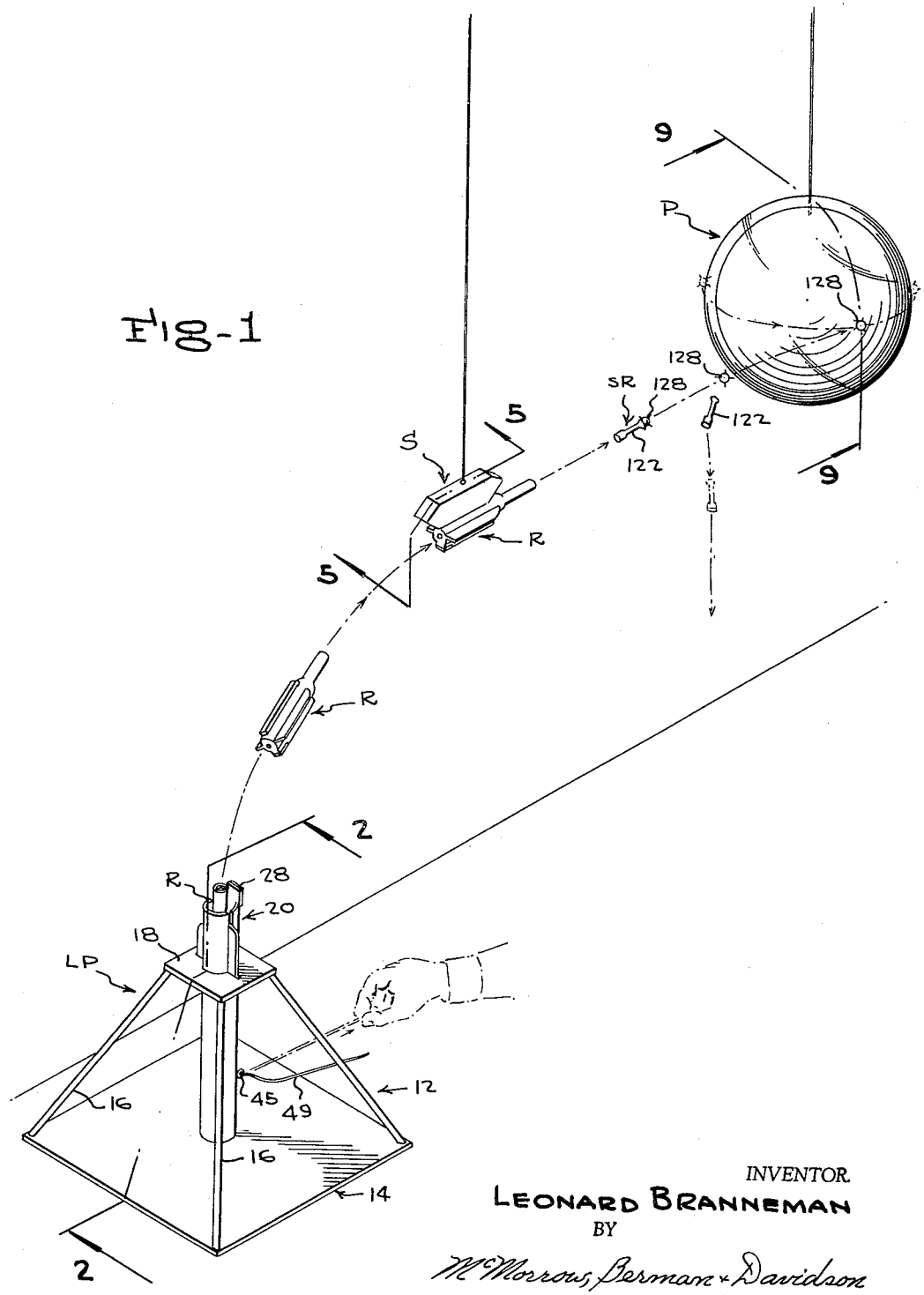

Referring in detail to the drawings, wherein like numerals designate like parts throughout the several views, the illustrated satellite system, shown in FIGURE 1, comprises a launching pad LP, one or more multi-stage rocket assemblies R, a suspended space station S, a second-stage rocket SR, and a suspended planet P.

The launching pad LP comprises a frusto-pyramidical stand 12 having a rectangular base plate 14, from whose corners fixed upwardly convergent legs 16 extend to and are fixed to the corners of a rectangular platform 18, the last being smaller in area than and centered relative to the base plate 14. A perpendicular first-stage launching tube 20 is fixed, at its lower end, to the center of the base plate 14 and extends upwardly through a centered opening 22, provided in the platform 18, to a substantial height above the platform.

As shown in FIGURES 2 through 4, the launching tube 20 is open, at its upper end, which has an upper edge which has, on its side thereof facing the space station S, an upstanding leg 24, on which is fixed a vertical flat permanent magnet 28.

At a level spaced below the platform 18 and above the base plate 14, the launching tube 20 has an internal partition 30, formed with a central opening 32, through which a cylindrical plunger rod 34 works. The rod 34 has a fixed, enlarged diameter collar 36, on its lower end, which slides within the tube 20, bears upon the upper end of a coil propulsion spring 38, whose lower end rests upon the base plate 14, around an air-vent opening 26 in the base plate. An annular resilient and compressible pad 40 is circumposed on the rod 34 and is secured on the upper surface of the collar 36, the pad being adapted to engage the partition 30, as the spring 38 drives the rod 34 upwardly, and absorb the resultant shock and noise. The rod 34 has an enlarged diameter head 42, on its upper end, above the partition 30, which is somewhat smaller in diameter than the bore of the launching tube, and which is adapted to engage and support the lower end of a multi-stage rocket assembly R, within the upper part of the launching tube, preliminary to launching of the assembly, as shown in FIGURE 2. The plunger rod 34 is adapted to be manually depressed to cocked position, wherein the spring 38 is compressed, by inserting a rocket assembly R in the upper end of the tube 20 and forcing the same downwardly until the pad 40 is on a level below a radial bore 43, in the sidewall of the tube 20. The bore 43 is provided to receive a removable stop pin 45, adapted to engage the top of the pad 40 and hold the rod 34 down in cocked position. The pin 45 has a ring 47, on its outer end, to which a releasing cord 49 is secured, which is adapted to be pulled to retract the pin 45 and release the plunger rod for propelling the rocket assembly R out of the launching tube.

The multi-stage rocket R comprises, as shown in FIGURES 2 through 8, a longitudinally elongated hollow cylindrical casing 44, having a uniform diameter side wall 46, and a rear end wall 48, provided with a centered airvent opening 50. At its forward end, the casing side wall 46 is tapered, as indicated at 52, and is fixed to an intermediate part of the side wall 54 of a second-stage launching tube 56. The casing 44 has diametrically opposed airfoils 55 on its sides, which engage in vertical slots 57 in the sidewall of the launching tube 20, for properly positioning therein a multi-stage rocket assembly R.

The second-stage launching tube 56 is substantially smaller in diameter than the casing side wall 46 and is concentrically spaced therefrom, and is uniformly cylindrical. The tube 56 has an open rear end 58 and an open forward end 60, and, at its rear end, is fixed to the casing side wall 46 and spaced therefrom, by an annular spacer 62.

The second-stage launching tube 56 contains a second-stage propulsion spring assembly 64, which comprises a longitudinally disposed length of resilient rubber, such as surgical tubing 66, which is shorter than the tube 56, and is anchored, at its rear end, to the tube 56, as indicated at 68. The forward end of the tubing 66 is securably engaged, as indicated at 70, over the rear end of a longitudinal plunger stem 72, substantially smaller in diameter than the tube 56, and having enlarged diameter head 74, on its forward end, which slides in the tube 56. A detent lug 76 is fixed to and extends downwardly from the rear part of the stem 72.

A longitudinally elongated rectangular housing 78 is fixed to the underside of and extends substantially the length of the casing 44, which has sidewalls 80 and a bottom wall 82. The bottom wall 82 has a centered notch 84, in its rear end, in which is fixed a flat permanent magnet 86, which is flush with the under or outer surface of the bottom wall. The magnet 86 is adapted to cooperate with the first-stage launching tube magnet 28, as hereinafter detailed.

The casing side wall 46 and the second-stage launching tube side wall are formed with registered openings 88 and 90, respectively, spaced midway between the ends of the casing 44, through which works freely an upstanding trigger lug 92, which is fixed to an intermediate part of a longitudinally elongated flat trigger spring 94, which extends lengthwise in the housing 78, and is suitably fixed, at its forward end, as indicated at 96, to the outer surface of the tapered forward end 52 of the casing 44. The trigger spring 94 is a component of a time-delay assembly 95.

The trigger spring 94 has a rear end, which is spaced forwardly from the magnet 86, and a downwardly or laterally extending right-angularly related trip arm 100 is fixed to the spring near the rear end thereof, which extends freely through an opening 102, provided in the housing bottom wall 82, for engagement with the inner surface of the sidewall of the first-stage launching tube 20, as shown in FIGURE 2, in an unoperated condition of the spring 94, wherein, as shown in FIGURE 7, the spring can be in contact with the side wall of the casing 44.

The time-delay assembly 95 further comprises a longitudinally elongated resilient and compressible capsule 104 which is disposed longitudinally along and is fixed on the upper surface of a forwardly flaring ramp 106, formed on the forward part of the housing bottom wall 82 and terminating, at its rear end 108, behind the openings 88 and 90. The capsule 104 is closed and contains a body of fluid 110, such as oil, whose mass is less than the volumetric capacity of the capsule. Midway between its ends, the capsule is provided with a partition wall 112, which is formed with a restricted bleeder opening 114.

The trigger spring 94 has affixed to its underside a longitudinal presser block 116 which is shorter than and overlies the rear half 118 of the capsule 104, behind its partition wall 112, the block 116 having a tapered undersurface 120 which parallels the upper surface of the ramp 106, so that when the trigger spring 94 is freed to operate, it moves downwardly and causes the block 116 to squeeze the rear half of the capsule and force the fluid 110 forwardly through the bleeder opening 114, into the forward half of the capsule, at a rate such that the rocket assembly R can reach the space station S, from the launching pad LP, some time before the second-stage launching tube propulsion means can go into operation to propel a second-stage rocket SR toward the planet P.

As shown in FIGURES 2 and 3, the tubing spring 66 of the second-stage launcher is adapted to be rearwardly compressed to cocked position, by forcing the head 74 rearwardly, until the detent lug 76 can engage behind the trigger lug 92, as shown in FIGURES 2, 3 and 7. This can be done by forcing the second-stage rocket SR into the forward end of the second-stage launching tube 56.

The second-stage rocket SR comprises an elongated hollow, lightweight, cylindrical cross section booster 122, which tapers forwardly from a maximum diameter rear end 124, which has a sliding fit in the second-stage launching tube 56, to an enlarged diameter cup 126, on its forward end. A spherical satellite 128 seats snugly in the cup 126, and, as shown in FIGURES 2 and 3, is engaged in the tube 56, along with the booster 122.

The satellite 128, as shown in FIGURE 11, is composed of a resilient and compressible ball 130 having a relatively heavy spherical magnet core 132, and circumferentially spaced and diametrically opposed, radial flexible steel needles 134 which extend out of the ball 130. The needles 134 serve as representations of rays emanating from the satellite, and also to increase the magnetic attraction of the satellite to the planet P.

As the second-stage rocket SR is propelled out of the second-stage launching tube 56, toward the planet P, the booster 122, being lighter in weight when the satellite 128, falls away, as shown in FIGURE 1, and the satellite continues its flight to the planet P.

As shown in FIGURES 9, 10, and 12, the planet P is spherical and comprises an outer plastic material shell 136 and a concentric inner plastic material shell 138, which are spaced and connected by radial ribs 140. Both of these shells can be transparent, and are formed with registered access openings 142 and 144, respectively, whose edges are formed with V-shaped grooves 146, as shown in FIGURE 12, to receive snap-in closure discs 148, having V-shaped edges 150. Hand or implement holes 152 are provided in the discs.

Relatively small magnets 154 are secured to the inner surface of the inner shell 138, which serve to retract and draw toward the planet P, a satellite 128 nearing the planet, and to assist in its being carried around the planet by a magnetic rotor 156.

The magnetic rotor 156 is disposed within the inner shell 138 on a horizontal diameter of the planet, and comprises an elongated flat bar 158 having heavy thick magnet blocks 160 fixed thereon at the ends of the bar and positioned close to the inner shell 138. The bar 158 is fixed, at its center, on a cup 162, which receives an upstanding perpendicular shaft 164, to which it is pinned, as indicated at 166. The shaft 164 is supportably journalled through the upper member 168 of a gear frame 170, which, at its lower end, is fixed to a base frame 172 which is fixed, at its lower end, to the inner shell 138. An electric motor 174 is mounted upon the cross member 176 of the base frame 172 and has an upstanding shaft 178, which is operatively connected to speed reducing gearing 180, supported within the gear frame 170 and operatively connected to the rotor shaft 164, whereby the rotor 156 is rotated at a relatively slow speed. Batteries 182 are supported within the base frame 172 and are connected to the motor 174, and to an on-and-off switch 184, mounted on and exposed at the underside of the outer shell 136.

The planet P is suspended, as from a ceiling (not shown) or the like, by means of a wire or cord 186, which is secured, as indicated at 188, to the inner shell 138, at the top thereof, and passes up through a hole 190 in the outer shell 136, the arrangement being such that the planet remains still while the rotor 156 rotates.

The space station S comprises a preferably solid elongated rectangular block 192, having conical ends 194, and formed, in its underside with a longitudinal groove 196, in which is secured an elongated flat magnet 198, whose outer underside is flush with the underside of the block 192. An upstanding eye 200 is secured in the top of the block 192, at a point forwardly of the middle of the block, so that the space station assumes an upwardly and forwardly tilted position, when suspended by a cord or wire 202, connected to the eye 200, from a support such as a ceiling (not shown). The magnet 198 serves to attract a multi-stage rocket assembly R reaching the immediate vicinity of the space station S, to the space station and hold the same in contact therewith, by means of the attraction of the magnet 198 for an elongated flat magnet 199 which is secured along the top of the casing 44 of the rocket assembly R.

The fact that the space station magnet 198 has north and south poles serves to position the space station with its north pole pointing toward the terrestial north pole. Because of this position of the space station, the launching pad LP and the planet P must be lined up with the space station S. Further, the space station S must be positioned at the right height, relative to the trajectory of a rocket assembly R propelled from the launching pad LP, so that the assembly R will reach the space station on a line below and close to its underside and the magnet 198 of the space station. The planet P must be suspended at such a height that a satellite propelled toward the satellite would arrive thereat ideally in the plane of the equator and at either side of the planet.

The multi-stage rocket assembly R is propelled from the first-stage launching tube 20, toward the space station S in the following manner:

As the rocket assembly R is inserted into the first-stage launching tube 20, with the plunger rod 34 in depressed and cocked position, trip arm 100 of the trigger spring 94 engages the sidewall of the launching tube 20, as shown in FIGURE 2, whereby the spring 94 is pressed inwardly to unoperated position, so that the presser ramp 116 is retracted from the time-delay capsule 104, allowing all of the fluid 110 in the capsule to drain to the lower half 118 thereof. At about the same time, the trigger lug 92 in the spring 94 enters the holes 88 and 90, in front of the detent lug 76, as the second-stage rocket SR is inserted downwardly in the second-stage launching tube 56 to cock it. As a result, the second-stage rocket SR is held in place, in a cocked condition.

As the pin 45 is released, by pulling on the cord 49, the plunger rod 34 rises and pushes the rocket assembly R upwardly out of the first-stage launching tube 20. As the rocket assembly R is about to leave the launching tube 20, its magnet 86 reaches and repels the magnet 28 of the launching tube, whereby the rocket assembly R is tilted, as it leaves the launching tube, as indicated in phantom lines in FIGURE 3, into a high angled trajectory, toward the space station S.

As will be understood from the foregoing description, operation of the satellite system affords amusement, clearly and graphically illustrates the mechanics and physics of an actual satellite launching and orbiting system, and requires of the player opportunity for the development of skill and accuracy in the operation of the system.

Although there has been shown and described a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. An educational toy satellite system comprising a suspended planet, a suspended space station substantially on a level with and spaced from the planet, a first-stage launching pad alined with the space station and the planet and supported on a level therebelow, a multi-stage rocket assembly adapted to be propelled from the launching pad in a trajectory toward the space station, magnets on the rocket assembly and on the space station operative to attract the rocket assembly to the space station and hold the rocket assembly to the space station, said multi-stage rocket assembly having second-stage launching means aimed at the planet, and a second-stage rocket engaged in said second-stage launching means, said second-stage rocket comprising a booster and a satellite engaged with the booster, said satellite having a magnet, and the planet having magnet means serving to attract the satellite to the planet on near approach of the satellite to the planet.

2. An educational toy satellite system comprising a suspended planet, a suspended space station substantially on a level with and spaced from the planet, a first-stage launching pad alined with the space station and the planet and supported on a level therebelow, a multi-stage rocket assembly adapted to be propelled from the launching pad in a trajectory toward the space station, magnets on the rocket assembly and on the space station operative to attract the rocket assembly to the space station and hold the rocket assembly to the space station, said multi-stage rocket assembly having second-stage launching means aimed at the planet, and a second-stage rocket engaged in said second-stage launching means, said second-stage rocket comprising a booster and a satellite engaged with the booster, said satellite having a magnet, and the planet having magnet means serving to attract the satellite to the planet on near approach of the satellite to the planet, said booster being lighter in weight than the satellite and adapted to fall away behind the satellite as the satellite travels toward the planet.

3. An educational toy satellite system according to claim 2, wherein said launching pad comprises a stand having a perpendicular launching tube having an open upper end, a launching spring supported in the lower end of the launching tube, a plunger rod engaged at its lower end with the spring, said rod having a collar at its lower end having a resilient pad thereon, the tube sidewall having a radial bore through which a removable retaining pin is engaged with the top of the pad, said tube having a partition wall through which the rod works, said rod having an enlarged diameter head on its upper end above the partition wall.

4. An educational toy satellite system according to claim 2, wherein said launching pad comprises a stand having a perpendicular launching tube having an open upper end, a launching spring supported in the lower end of the launching tube, a plunger rod engaged at its lower end with the spring, said rod having a collar at its lower end having a resilient pad thereon, the tube sidewall having a radial bore through which a removable retaining pin is engaged with the top of the pad, said tube having a partition wall through which the rod works, said rod having an enlarged diameter head on its upper end above the partition wall, said multi-stage rocket assembly comprising a normally horizontal casing on top of which the related magnet is secured, said casing containing a reduced diameter second-stage launching tube extending forwardly from the casing, a housing extending along and secured to the underside of the casing, a trigger spring extending along the underside of the casing within said housing end secured at its forward end to the casing, the sidewalls of the casing and the second-stage launching tube having aligned openings, said trigger spring having a lateral trigger lug extending through said openings and having in a lateral trip arm on its rear end extending out of the housing, a pressure block on the trigger spring, said housing having a bottom wall spaced from the sidewall of the casing, a ramp on said bottom wall facing the pressure block, an elongated flexible and resilient closed time-delay capsule having a rear portion overlying and secured to the ramp and a forward portion positioned forwardly of the ramp, said capsule having a partition wall intermediate its ends and formed with a bleeder hole, and a body of fluid enclosed within the capsule and normally occupying the rear part of the capsule, said second-stage propulsion means comprising a resilient, lengthwise compressible spring member within and fixed at its rear end to the rear end of the second-stage launching tube, a stem to which the spring member is secured at its forward end, a head on the forward end of the stem sliding in the second-stage launching tube, said stem having a lateral detent lug adapted to be engaged behind the trigger lug of the trigger spring in the rearwardly compressed cocked condition of the stem and the spring member.

5. An educational toy satellite system according to claim 2, wherein said launching pad comprises a stand having a perpendicular launching tube having an open upper end, a launching spring supported in the lower end of the launching tube, a plunger rod engaged at its lower end with the spring, said rod having a collar at its lower end having a resilient pad thereon, the tube sidewall having a radial bore through which a removable retaining pin is engaged with the top of the pad, said tube having a partition wall through which the rod works, said rod having an enlarged diameter head on its upper end above the partition wall, said multi-stage rocket assembly comprising a normally horizontal casing on top of which the related magnet is secured, said casing containing a reduced diameter second-stage launching tube extending forwardly from the casing, a housing extending along and secured to the underside of the casing, a trigger spring extending along the underside of the casing within said housing and secured at its forward end to the casing, the sidewalls of the casing and the second-stage launching tube having aligned openings, said trigger spring having a lateral trigger lug extending through said openings and having a lateral trip arm on its rear end extending out of the housing, a pressure block on the trigger spring, said housing having a bottom wall spaced from the sidewall of the casing, a ramp on said bottom wall facing the pressure block, an elongated flexible and resilient closed time-delay capsule having a rear portion overlying and secured to the ramp and a forward portion positioned forwardly of the ramp, said capsule having a partition wall intermediate its ends and formed with a bleeder hole, and a body of fluid enclosed within the capsule and normally occupying the rear part of the capsule, said second-stage propulsion means comprising a resilient, lengthwise compressible spring member within and fixed at its rear end to the rear end of the second-stage launching tube, a stem to which the spring member is secured at its forward end, a head on the forward end of the stem sliding in the second-stage launching tube, said stem having a lateral detent lug adapted to be engaged behind the trigger lug of the trigger spring in the rearwardly compressed cocked condition of the stem and the spring member, said launching pad having an upstanding first-stage launching tube having a sidewall, said multi-stage rocket assembly being engaged in the upper end of the first-stage launching tube, with the trip arm of the trigger spring of the multi-stage rocket assembly engaged with the sidewall of the first-stage launching tube and the trigger spring forced inwardly in front of the detent lug of the stem of the second-stage rocket, and means in the first-stage launching tube for propelling the multi-stage rocket assembly out of the first-stage launching tube toward the space station, passage of the rocket assembly therefrom serving to release the trip arm and the trigger spring and free the trigger spring to press the pressure block against the rear portion of the time-delay capsule and compress the fluid therein through the bleeder hole into the forward portion thereof while withdrawing the trigger lug from the detent pin so as to free the spring member to expand and push the stem and its head forwardly in the second-stage launching tube.

6. An educational toy satellite system according to claim 2, wherein said launching pad comprises a stand having a perpendicular launching tube having an open upper end, a launching spring supported in the lower end of the launching tube, a plunger rod engaged at its lower end with the spring, said rod having a collar at its lower end having a resilient pad thereon, the tube sidewall having a radial bore through which a removable retaining pin is engaged with the top of the pad, said tube having a partition wall through which the rod works, said rod having an enlarged diameter head on its upper end above the partition wall, said multi-stage rocket assembly comprising a normally horizontal casing on top of which the related magnet is secured, said casing containing a reduced diameter second-stage launching tube extending forwardly from the casing, a housing extending along and secured to the underside of the casing, a trigger spring extending along the underside of the casing within said housing and secured at its forward end to the casing, the sidewalls of the casing and the second-stage launching tube having aligned openings, said trigger spring having a lateral trigger lug extending through said openings and having a lateral trip arm on its rear end extending out of the housing, a pressure block on the trigger spring, said housing having a bottom wall spaced from the sidewall of the casing, a ramp on said bottom wall facing the pressure block, an elongated flexible and resilient closed time-delay capsule having a rear portion overlying and secured to the ramp and a forward portion positioned forwardly of the ramp, said capsule having a partition wall intermediate its ends and formed with a bleeder hole, and a body of fluid enclosed within the capsule and normally occupying the rear part of the capsule, said second-stage propulsion means comprising a resilient, lengthwise compressible spring member within and fixed at its rear end to the rear end of the second-stage launching tube, a stem to which the spring member is secured at its forward end, a head on the forward end of the stem sliding in the second-stage launching tube, said stem having a lateral detent lug adapted to be engaged behind the trigger lug of the trigger spring in the rearwardly compressed cocked condition of the stem and the spring member, said launching pad having an upstanding first-stage launching tube having a sidewall, said multi-stage rocket assembly being engaged in the upper end of the first-stage launching tube, with the trip arm of the trigger spring of the multi-stage rocket assembly engaged with the sidewall of the first-stage launching tube and the trigger spring forced inwardly in front of the detent lug of the stem of the second-stage rocket, and means in the first-stage launching tube for propelling the multi-stage rocket assembly out of the first-stage launching tube toward the space station, passage of the rocket assembly therefrom serving to release the trip arm and the trigger spring and free the trigger spring to press the pressure block against the rear portion of the time-delay capsule and compress the fluid therein through the bleeder hole into the forward portion thereof while withdrawing the trigger lug from the detent pin so as to free the spring member to expand and push the stem and its head forwardly in the second-stage launching tube, said second stage rocket comprising an elongated booster slidably engaged in the forward end of the second-stage launching tube against said head, said booster having a cup on its forward end, and a spherical satellite engaged in the second-stage launching tube and seated in said cup.

7. An educational toy satellite system according to claim 2, wherein said launching pad comprises a stand having a perpendicular launching tube having an open upper end, a launching spring supported in the lower end of the launching tube, a plunger rod engaged at its lower end with the spring, said rod having a collar at its lower end having a resilient pad thereon, the tube sidewall having a radial bore through which a removable retaining pin is engaged with the top of the pad, said tube having a partition wall through which the rod works, said rod having an enlarged diameter head on its upper end above the partition wall, said multi-stage rocket assembly comprising a normally horizontal casing on top of which the related magnet is secured, said casing containing a reduced diameter second-stage launching tube extending forwardly from the casing, a housing extending along and secured to the underside of the casing, a trigger spring extending along the underside of the casing within said housing and secured at its forward end to the casing, the sidewalls of the casing and the second-stage launching tube having aligned openings, said trigger spring having a lateral trigger lug extending through said openings and having a lateral trip arm on its rear end extending out of the housing, a pressure block on the trigger spring, said housing having a bottom wall spaced from the sidewall of the casing, a ramp on said bottom wall facing the pressure block, an elongated flexible and resilient closed time-delay capsule having a rear portion overlying and secured to the ramp and a forward portion positioned forwardly of the ramp, said capsule having a partition wall intermediate its ends and formed with a bleeder hole, and a body of fluid enclosed within the capsule and normally occupying the rear part of the capsule, said second-stage propulsion means comprising a resilient, lengthwise compressible spring member within and fixed at its rear end to the rear end of the second-stage launching tube, a stem to which the spring member is secured at its forward end, a head on the forward end of the stem sliding in the second-stage launching tube, said stem having a lateral detent lug adapted to be engaged behind the trigger lug of the trigger spring in the rearwardly compressed cocked condition of the stem and the spring member, said launching pad having an upstanding first-stage launching tube having a sidewall, said multi-stage rocket assembly being engaged in the upper end of the first-stage launching tube, with the trip arm of the trigger spring of the multi-stage rocket assembly engaged with the sidewall of the first-stage launching tube and the trigger spring forced inwardly in front of the detent lug of the stem of the second-stage rocket, and means in the first-stage launching tube for propelling the multi-stage rocket assembly out of the first-stage launching tube toward the space station, passage of the rocket assembly therefrom serving to release the trip arm and the trigger spring and free the trigger spring to press the pressure block against the rear portion of the time-delay capsule and compress the fluid therein though the bleeder hole into the forward portion thereof while withdrawing the trigger lug from the detent pin so as to free the spring member to expand and push the stem and its head forwardly in the second-stage launching tube, said satellite comprising a resilient and compressible ball having a weighted magnet core.

8. An educational toy satellite system according to claim 2, wherein said launching pad comprises a stand having a perpendicular launching tube having an open upper end, a launching spring supported in the lower end of the launching tube, a plunger rod engaged at its lower end with the spring, said rod having a collar at its lower end having a resilient pad thereon, the tube sidewall having a radial bore through which a removable retaining pin is engaged with the top of the pad, said tube having a partition wall through which the rod works, said rod having an enlarged diameter head on its upper end above the partition wall, said multi-stage rocket assembly comprising a normally horizontal casing on top of which the related magnet is secured, said casing containing a reduced diameter second-stage launching tube extending forwardly from the casing, a housing extending along and secured to the underside of the casing, a trigger spring extending along the underside of the casing within said housing and secured at its forward end to the casing, the sidewalls of the casing and the second-stage launching tube having aligned openings, said trigger spring having a lateral trigger lug extending through said openings and having a lateral trip arm on its rear end extending out of the housing, a pressure block on the trigger spring, said housing having a bottom wall spaced from the sidewall of the casing, a ramp on said bottom wall facing the pressure block, an elongated flexible and resilient closed time-delay capsule having a rear portion overlying and secured to the ramp and a forward portion positioned forwardly of the ramp, said capsule having a partition wall intermediate its ends and formed with a bleeder hole, and a body of fluid enclosed within the capsule and normally occupying the rear part of the capsule, said second-stage propulsion means comprising a resilient, lengthwise compressible spring member within and fixed at its rear end to the rear end of the second-stage launching tube, a stem to which the spring member is secured at its forward end, a head on the forward end of the stem sliding in the second-stage launching tube, said stem having a lateral detent lug adapted to be engaged behind the trigger lug of the trigger spring in the rearwardly compressed cocked condition of the stem and the spring member, said launching pad having an upstanding first-stage launching tube having a sidewall, said multi-stage rocket assembly being engaged in the upper end of the first-stage launching tube, with the trip arm of the trigger spring of the multi-stage rocket assembly engaged with the sidewall of the first-stage launching tube and the trigger spring forced inwardly in front of the detent lug of the stem of the second-stage rocket, and means in the first-stage launching tube for propelling the multi-stage rocket assembly out of the first-stage launching tube toward the space station, passage of the rocket assembly therefrom serving to release the trip arm and the trigger spring and free the trigger spring to press the pressure block against the rear portion of the time-delay capsule and compress the fluid therein through the bleeder hole into the forward portion thereof while withdrawing the trigger lug from the detent pin so as to free the spring member to expand and push the stem and its head forwardly in the second-stage launching tube, said satellite comprising a resilient and compressible ball having a weighted magnet core, and flexible steel needles projecting radially from the ball.

9. An educational toy satellite system according to claim 1, wherein said space station comprises an elongated non-magnetic block having an elongated flat magnet fixed to and extending along its underside, suspension means connected to the block at a location forwardly of its mid-length point whereby the space station is positioned at an upward angle toward the planet with the north pole of its magnet pointing to the planet.

10. An educational toy satellite system according to claim 1, wherein said planet comprises concentrically spaced outer and inner spherical shells, means spacing and connecting the shells, fixed magnets distributed around and secured to the inner shell, suspension means extending through the top of the outer shell and secured to the inner shell, a horizotal rotor bar within the inner shell and having heavy magnets on its ends located close to the inner shell, means centrally supporting said rotor bar at its center for rotation on a vertical axis, and motor means within the inner shell operatively connected to the rotor bar.

11. An educational toy satellite system according to claim 1, wherein said planet comprises concentrically spaced outer and inner spherical shells, means spacing and connecting the shells, fixed magnets distributed around and secured to the inner shell, suspension means extending through the top of the outer shell and secured to the inner shell, a horizontal rotor bar within the inner shell and having heavy magnets on its ends located close to the inner shell, means centrally supporting said rotor bar at its center for rotation on a vertical axis, and motor means within the inner shell operatively connected to the rotor bar, said motor means comprising an electric motor geared to the rotor bar, battery means connected to the motor, and an external switch mounted on the outer shell and in circuit with the motor and the battery means.

12. An educational toy satellite system according to claim 1, wherein said planet comprises concentrically spaced outer and inner spherical shells, means spacing and connecting the shells, fixed magnets distributed around and secured to the inner shell, suspension means extending through the top of the outer shell and secured to the inner shell, a horizontal rotor bar within the inner shell and having heavy magnets on its ends located close to the inner shell, means centrally supporting said rotor bar at its center for rotation on a vertical axis, and motor means within the inner shell operatively connected to the rotor bar, said motor means comprising an electric motor geared to the rotor bar, battery means connected to the motor, and an external switch mounted on the outer shell and in circuit with the motor and the battery means, and registered access openings in the outer and inner shells providing access to the motor and the battery means, and removable closure discs engaged in these openings.

References Cited in the file of this patent

UNITED STATES PATENTS

| | | |
|---|---|---|
| 647,327 | Rehlin | Apr. 10, 1900 |
| 2,923,089 | Fissel | Feb. 2, 1960 |
| 2,975,551 | Oberinger | Mar. 21, 1961 |
| 3,032,918 | Giuliano | May 8, 1962 |
| 3,108,395 | Goldfarb | Oct. 29, 1963 |